Sept. 28, 1954  W. H. MOORHEAD  2,690,470
FLEXIBLE GROMMET
Filed Aug. 2, 1950
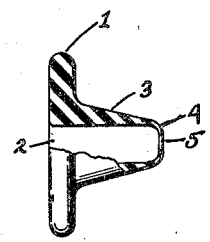
*Fig_1_*
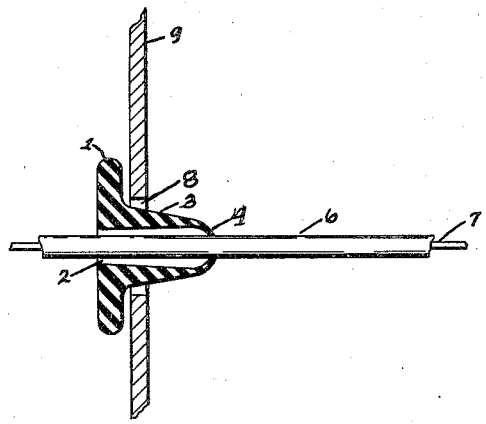
*Fig_2_*
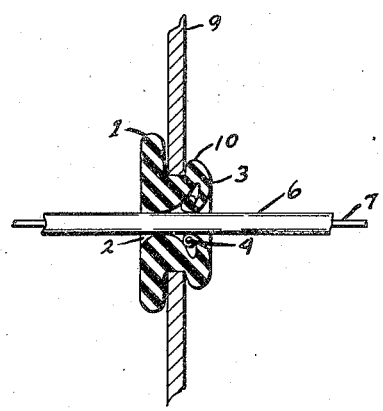
*Fig_3_*
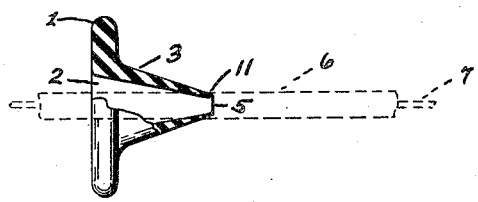
*Fig_4_*
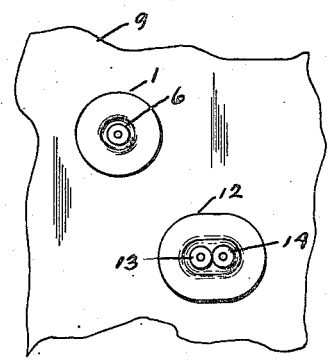
*Fig_5_*
INVENTOR.
WALTER H. MOORHEAD
BY
*Frank H. Harmon*
ATTORNEY Patented Sept. 28, 1954

2,690,470

UNITED STATES PATENT OFFICE 2,690,470

FLEXIBLE GROMMET

Walter H. Moorhead, Richmond Heights, Ohio

Application August 2, 1950, Serial No. 177,150

3 Claims. (Cl. 174—153)

This invention relates to improvements in flexible grommets and has for one of its primary objects to provide a simple, inexpensive and efficient grommet that is universal in its application.

Another object is to provide a grommet that may more readily be inserted and removed, with respect to the wall, or panel, which carries it, and with respect to the electric cord, or other member, which it carries and which it protects from the wall.

Another object is to provide a flexible hollow grommet with a pre-formed single end flange and a tapered body which latter may be readily inserted through a hole in the panel, a portion of the bore of the tapered hollow body being less in diameter than the outside diameter of the cable that passes through the grommet so that upon pulling of the cord outwardly, while holding the grommet in place, the grommet body will frictionally grip the cord and roll inwardly upon itself to form another flared end on the other side of the wall and otherwise deform the grommet to enlarge it into a snug fit in the hole in the wall.

With the foregoing and other objects in view, the invention resides in the combination of parts and in the details of construction hereinafter set forth in the following specification and appended claims, certain embodiments thereof being shown in the accompanying drawings, in which:

Figure 1 is a view partly in side elevation and partly in longitudinal section of one form of a flexible tapered grommet in accordance with my invention;

Figure 2 is a view in section taken through a panel and my hollow flexible grommet passing therethrough and showing an electric cord extending through the grommet, the grommet being shown in its normal undeformed condition;

Figure 3 is a view similar to Figure 2, showing the grommet deformed by pulling the cord outwardly so as to be formed into two flared ends;

Figure 4 is a view partly in side elevation and partly in longitudinal section of a modified form of tapered flexible grommet, showing in dotted lines a cord passing through the grommet; and Figure 5 is a fragmentary view of a panel, showing the exterior of two grommets, one supporting one cable and the other supporting two electric cords.

Referring more particularly to the drawings, I have shown in Figure 1 a hollow grommet which may be made of flexible material, such as rubber, or the like. It is formed with a single enlarged end 1, a main bore 2, and a tapering wall thickness body 3 that terminates in a thin inwardly extending ring lip 4 so as to leave its end bore 5 of less diameter than that of the main bore 2.

In assembly I may pass an electric cord, having its cover 6 and electric wire 7, pass through the grommet, from left to right, and then loosely insert the grommet, with clearance, from left to right, in a hole 8 in a panel 9, as shown in Figure 2. The end hole 5 in the thin flexible lip end 4 of the grommet is smaller than the cord so as to resiliently grip the cord, whereas the cord fits loosely with clearance in the main bore 2 of the grommet.

Therefore, when I pull the cord toward the left with one hand, while holding the grommet head 1 against the wall, the tapered lip 4 maintains its resilient frictional grip on the cord. Consequently, the lip 4, as well as the body 3, rolls inwardly upon itself until the flexible grommet, as a whole, assumes the distorted position shown in Figure 3. The main effect of this rolling action is to provide a second grommet head 10 on the opposite side of the panel. It also deforms the body of the grommet radially outwardly into snug engagement with the hole 8 in the panel. Moreover, the grommet is deformed to be forced into snug engagement with the cord on both sides of the panel.

In Figure 4, I have shown a modified form of grommet, the installation and removal of which is the same as that described above in connection with Figures 1, 2 and 3. It merely replaces the particular lip end 4 with a straight tapered wall thickness end 11 whose bore is of less diameter than the outside diameter of the cord. The rolling and unrolling action of the flexible grommet remains the same in principle.

In Figure 5, I have shown its adaptation both for a round hole in the panel 9 and also for an elliptical hole for an elliptical grommet 12 for carrying two electric cords 13 and 14.

Thus it will be seen that I have provided an improved grommet which has many advantageous features over the conventional. The conventional flexible grommet contemplates the use of a rubber hollow ring with two preformed flared heads and a short body therebetween. Insertion in a panel hole is difficult because each head is larger than the panel hole and calls for squeezing one head through the hole. Once inserted, the body is invariably of less diameter than the panel hole so as to be loose and subject to inadvertent removal from the panel hole.

This is not the case in my improved grommet. The outside flared head 1 does not change its appearance over the outside head of the conventional two-headed grommet. My grommet is not formed by pulling it through a panel hole so as to wedge it in the hole which would result in an unsightly assembly and make removal difficult. Such a grommet is shown in U. S. Patent to Seifer No. 2,223,153 of November 26, 1940. My grommet is merely formed by pulling the cord to roll the inside tapered body of the grommet into an inside flared head, which action also deforms the body into snug engagement with the cord and panel hole, regardless of its shape. However, the grommet is not permanently secured either to the panel nor the cord. Consequently, in order to dissassemble, I may merely pull the cord from left to right and the resulting action is to unroll the grommet so that the assembly assumes the position of Figure 2, leaving the grommet free to be easily removed from the cord and the panel.

I claim:

1. In combination with a panel having an aperture therein, a grommet of flexibly deformable material formed to comprise a single preformed enlarged end head and an elongated hollow body portion of lesser size than said preformed enlarged end head and tapered frustroconically from said preformed enlarged end head decreasingly toward a relatively small end portion that is lesser in outside diameter, inside diameter and in wall thickness and readily insertible, without deformation, through the aperture in said panel to leave said preformed single enlarged end head in abutment with one side surface of said panel, an elongated member slidably extending through said grommet with radial clearance in said preformed enlarged end head and the greater portion of its tapered elongated body portion, the smaller end portion only of said grommet being in resilient and frictional gripping relationship with said elongated member due solely to the inside diameter of said smaller grommet end being normally less than the outside diameter of said elongated body portion, whereby, upon a manual axial pull on said elongated member in a direction from the smaller end of said grommet toward said preformed large end head while holding the preformed enlarged end head of the grommet in place in abutment against one side surface of said panel, the hollow body of said grommet, due to the gripping relationship between its smaller end with said elongated member and the tapering annular clearance between the main elongated hollow body portion of said grommet and said elongated member, is rolled inwardly upon itself from said small end, progressively, toward said preformed large end head to form a second enlarged grommet head on the other side of said apertured panel opposite that of said preformed enlarged end head and the elongated tapered grommet body portion is flexibly deformed into snug engagement with said elongated member and said panel in the aperture of said panel.

2. In combination with a panel having an aperture therein, a grommet for use as a means for positioning an elongated member within said aperture in said panel as said member extends through said aperture, said grommet being of flexibly deformable material and comprising a single preformed enlarged end head and an elongated hollow body portion of lesser outside diameter than said preformed enlarged end head and tapered frustroconically from said preformed enlarged end head decreasingly to be smaller in outside diameter, inside diameter and in wall thickness and terminating at its relatively smaller end in an inturned lip, the elongated body portion of said grommet being readily inserted through said panel aperture to leave said single enlarged end head in abutment with one side surface of said panel, said elongated member extending through said grommet with radial clearance in said preformed enlarged end head and the greater portion of its tapered elongated body portion, the inturned lip of the smaller end portion only of said grommet being in gripping relationship with said elongated member, whereby, upon a manual axial pull on said elongated member in a direction from the smaller end of said grommet toward said preformed larger end head, while holding the preformed enlarged end head of the grommet in place in abutment against one side surface of said panel, the elongated hollow body of said grommet, due to the gripping relationship between the inturned lip at its smaller end with said elongated member, and the tapering annular clearance between the main elongated hollow body portion of said grommet and said elongated member is rolled inwardly upon itself from said smaller end progressively toward said preformed larger end head to form a second enlarged grommet head on the other side of said apertured wall member opposite that of said preformed enlarged end head and the elongated grommet body is flexibly deformed into snug engagement with said elongated member and said panel in the aperture of said panel.

3. In combination with a wall member having an aperture therein, a grommet of flexibly deformable material formed to comprise a single preformed enlarged end head and an elongated hollow body portion of lesser size than said preformed enlarged end head and tapered from said preformed enlarged end head decreasingly toward a relatively small end portion that is lesser in outside diameter and in wall thickness and readily insertible, without deformation, through the aperture in said panel to leave said preformed single enlarged end head in abutment with one side surface of said wall member, an elongated member slidably extending through said grommet, the smaller end portion of said grommet being in resilient and frictional gripping relationship with said elongated member due solely to the inside diameter of said smaller grommet end being normally less than the outside diameter of said elongated member, whereby, upon a manual axial pull on said elongated member in a direction from the smaller end of said grommet toward said preformed large end head while holding the preformed enlarged end head of the grommet in place in abutment against one side surface of said wall member, the hollow body of said grommet, due solely to the gripping relationship between the smaller end of the main elongated hollow body portion of said grommet and said elongated member, is rolled inwardly upon itself from said small end, progressively, toward said preformed large end head to form a second enlarged grommet head on the other side of said apertured panel opposite that of said preformed enlarged end head and the elongated tapered grommet body portion is flexibly deformed into snug engagement with said elongated member and said panel in the aperture of said panel.

References Cited in the file of this patent

UNITED STATES PATENTS

| Number | Name | Date |
|---|---|---|
| 1,292,524 | Serrell | Jan. 28, 1919 |
| 1,800,578 | Webb | Apr. 14, 1931 |
| 2,090,609 | Lemmon | Aug. 17, 1937 |
| 2,225,472 | Franklin | Dec. 17, 1940 |
| 2,311,427 | Winkelmeyer | Feb. 16, 1943 |
| 2,322,491 | Williams | Jan. 22, 1943 |
| 2,386,000 | McQuiston | Oct. 2, 1945 |

FOREIGN PATENTS

| Number | Country | Date |
|---|---|---|
| 182,147 | Switzerland | Jan. 31, 1936 |
| 262,532 | Great Britain | Dec. 16, 1926 |